(12) United States Patent
Zhang et al.

(10) Patent No.: US 7,839,810 B2
(45) Date of Patent: Nov. 23, 2010

(54) TRANSMITTER, COMMUNICATION SYSTEM AND COMMUNICATION METHOD

(75) Inventors: Xiaolin Zhang, Beijing (CN); Yunhui Liu, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 563 days.

(21) Appl. No.: 11/762,340

(22) Filed: Jun. 13, 2007

(65) Prior Publication Data
US 2007/0291700 A1     Dec. 20, 2007

(30) Foreign Application Priority Data
Jun. 19, 2006     (CN) ..................... 2006 1 0093047

(51) Int. Cl.
*H04B 7/00*     (2006.01)
(52) U.S. Cl. .................................... 370/310
(58) Field of Classification Search ............... 370/310, 370/328–330, 342–345, 431, 464; 375/260, 375/267
See application file for complete search history.

(56) References Cited

U.S. PATENT DOCUMENTS

| 7,164,669 | B2 * | 1/2007 | Li et al. ................ 370/336 |
|---|---|---|---|
| 7,230,928 | B2 * | 6/2007 | Katz et al. ............. 370/252 |
| 7,573,851 | B2 * | 8/2009 | Xing et al. ............. 370/334 |
| 7,630,337 | B2 * | 12/2009 | Zheng et al. ........... 370/329 |
| 2004/0042556 | A1 * | 3/2004 | Medvedev et al. ....... 375/260 |
| 2004/0120411 | A1 * | 6/2004 | Walton et al. .......... 375/260 |
| 2005/0201307 | A1 * | 9/2005 | Chae et al. ............. 370/310 |
| 2006/0056451 | A1 * | 3/2006 | Yano et al. ............. 370/468 |
| 2007/0009058 | A1 * | 1/2007 | Lee et al. ............... 375/267 |
| 2007/0066332 | A1 * | 3/2007 | Zhang et al. ........... 455/513 |
| 2009/0034456 | A1 * | 2/2009 | Peng et al. ............. 370/329 |

* cited by examiner

*Primary Examiner*—Dmitry H Levitan
(74) *Attorney, Agent, or Firm*—Dickstein Shapiro LLP

(57) ABSTRACT

The present invention provides a transmitter, a communication system and a communication method thereof. The transmitter according to the present invention comprises a transmission channel processing module for obtaining gains of respective sub-channels; a first transmission preprocessing module for performing a first transmission preprocessing to transmission data for a high-gain sub-channel based on a processed result from the transmission channel processing module; a second transmission preprocessing module for performing a second transmission preprocessing to transmission data for a low-gain sub-channel based on a processed result from the transmission channel processing module; and a transmitting antenna for summing up the transmission data processed by the first transmission preprocessing module and the second transmission preprocessing module respectively and transmitting them.

23 Claims, 2 Drawing Sheets

TRANSMITTER, COMMUNICATION SYSTEM AND COMMUNICATION METHOD

BACKGROUND OF THE INVENTION

1. Field of Invention

The present invention relates to a transmitter, a communication system and a communication method thereof.

2. Description of Prior Art

A technique for transmitting and/or receiving by using multiple antennas or antennas array (MIMO, Multiple Input and Multiple Output) is one of core technologies for the next generation broadband wireless communication system. A MIMO communication system uses $N_t$ transmitting antennas and $N_r$ receiving antennas to transmit data in parallel, and forms a MIMO channel matrix of size $N_r \times N_t$ which may be divided into L separately parallel space sub-channels, where $L <= \min(N_r, N_t)$, in which $\min(N_r, N_t)$ means to select the minor number of number $N_t$ and $N_r$. The separate data flow can be transmitted in parallel on the L separate space sub-channels in order to improve spectrum efficiency of the system, where $N_r$ and $N_t$ represent the numbers of receiving and transmitting antennas, respectively.

The separately parallel space sub-channels in the MIMO system don't have the same communication conditions. In particular, a channel gain, interference and fading of each space sub-channels are different. Moreover, the difference is generally significant. Therefore, a data transmission rate supported by each space sub-channels is different, which is also effected by a transmitting manner, a QoS (Quality of Service) requirement and a transmission power. As the communication conditions change, the system performances obtained by different signal transmission manners are different. For example, in the case of low signal-noise-ratio environment or the communication condition with line of sight (LOS), a beam-forming transmission can achieve a broader range of performance optimization. In other words, in the case of the channel environment with a high sub-channel gain, a beam-forming transmission is optimal; a correlation among antennas reduces performance of a Spatial-Temporal Coding system. A transmission signal processing performed by using the Channel State Information obtained from the Transmitter (CSIT) can further improve performance of the MIMO system. A transmission pre-coding or multi-mode transmission beam-forming is one of such techniques. Since by using CSIT, the transmitter may obtain the channel condition or fading status of each space sub-channels, the transmission power allocation, the transmission symbol bit allocation, the constellation selection, etc. can be performed according to knowledge about those space sub-channels, causing the performance of the MIMO system to be improved. However, in the case that it occurs a lager error in the CSIT obtained by the transmitter, the performance of the transmission pre-coding system will be significantly reduced on the low-gain sub-channel. Generally speaking, the system gain to be obtained by the transmission pre-coding technique is highly associated with the accuracy of CSIT obtained by the transmitter. The beam-forming or the single-mode transmission technique has a broader optimization range in the MIMO wireless environment with high-gain sub-channels or with LOS. On the other hand, the STC transmission technique needn't any channel state information.

SUMMARY OF THE INVENTION

Accordingly, the present invention provides a transmitter, a communication system and a communication method thereof, which can well combine a transmission pre-coding technique with a STC transmission technique so as to improve a system performance.

A transmitter according to the present invention comprises a transmission channel processing module for obtaining gains of respective sub-channels; a first transmission preprocessing module for performing a first transmission preprocessing on transmission data over a high-gain sub-channel based on a processed result from the transmission channel processing module; a second transmission preprocessing module for performing a second transmission preprocessing on transmission data over a low-gain sub-channel based on a processed result from the transmission channel processing module; and a transmitting antenna for summing up the transmission data processed by the first transmission preprocessing module and the second transmission preprocessing module respectively and transmitting them.

A communication system according to the present invention comprises the transmitter and a receiver, wherein the transmitter comprises a transmission channel processing module for obtaining gains of respective sub-channel; a first transmission preprocessing module for performing a first transmission preprocessing on transmission data over a high-gain sub-channel based on a processed result from the transmission channel processing module; a second transmission preprocessing module for performing a second transmission preprocessing on transmission data over a low-gain sub-channel based on a processed result of the transmission channel processing module; and a transmitting antenna for summing up the transmission data processed by the first transmission preprocessing module and the second transmission preprocessing module respectively and transmitting them; and the receiver comprises a reception antenna for receiving data from the transmitter; a data copy module for receiving data from the antenna and copying the received data; a first reception processing module for receiving any one of the data received and copied by the data copy module, and performing a first reception processing on the data in order to obtain the data processed through the first transmission preprocessing module; and a second reception processing module for receiving the other of the data received and copied by the data copy module, and performing a second reception processing on the data in order to obtain the data processed by the second transmission preprocessing module.

A communication method according to the present invention comprises Step a for determining gains of respective sub-channels; Step b for performing a first transmission preprocessing on transmission data over a high-gain sub-channel based on a result of Step a; Step c for performing a second transmission preprocessing on transmission data over a low-gain sub-channel based on a result of Step a; and Step d for summing up then transmission data processed by Step b and Step c and transmitting them.

According to the present invention, the characteristics of a low computation complexity for beam-forming technique and a STC design without CSIT are sufficiently utilized, so that sensitivity of a system performance to a channel state information (CSI) error is reduced and a robust system performance is achieved as compared with a complete use of a transmission pre-coding technique; and a transmission symbol rate is increased and a signal processing complexity in the transmitter and receiver is reduced as compared with a complete use of a STC technique.

DETAILED DESCRIPTION OF PREFERRED EMBODIMENTS

An object of the present invention is to provide a method of transmitting data on available transmission space sub-channels in the MIMO system so as to achieve better system performance and lower implementation complexity. In conditions of balancing the computation complexity, the system performance and the communication conditions, it provides a transmission signal processing scheme with the combination of transmission pre-coding and STC. In particular, after the MIMO channel is divided into L separately parallel space sub-channels, the transmitter obtains the information on the gain, phase, etc. of each space sub-channel. Then, the present invention performs beam-forming on the transmitted signal over the high-gain space sub-channels, and employs a concatenation signal processing technique with the STC concatenation pre-coding over the low-gain space sub-channels. And then, both the processed signals are summed up and transmitted by $N_t$ transmission antennas. According to the present invention, the characteristics of a low computation complexity for beam-forming technique and a STC design without CSIT are sufficiently utilized, so as to achieve the improved and robust system performance in a varying wireless channel environment.

Figure 1:
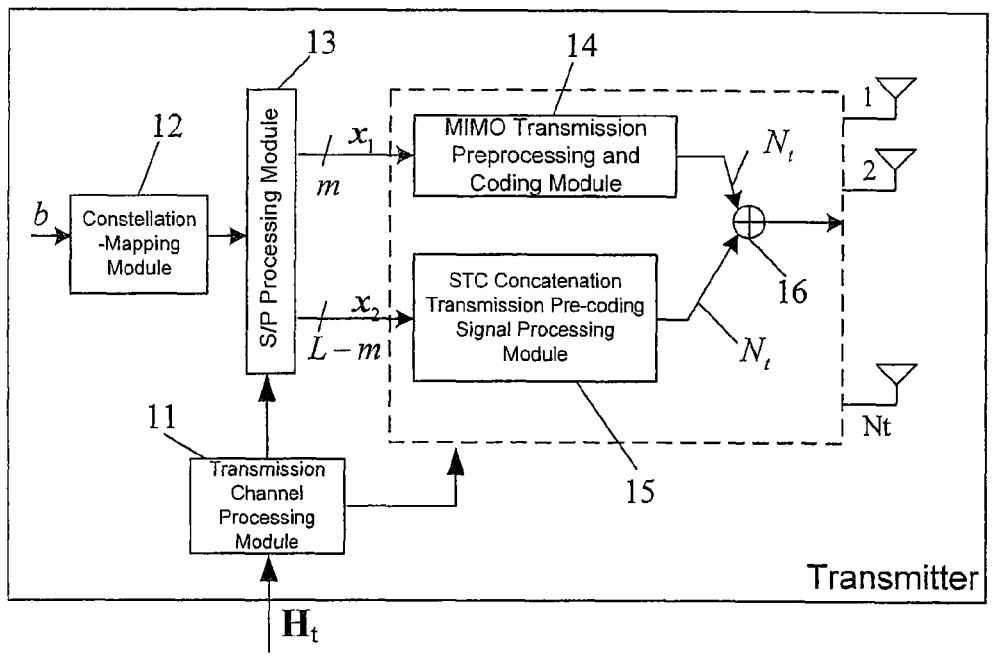
FIG. 1 is a block diagram of a transmitter according to the present invention.
Figure 2:
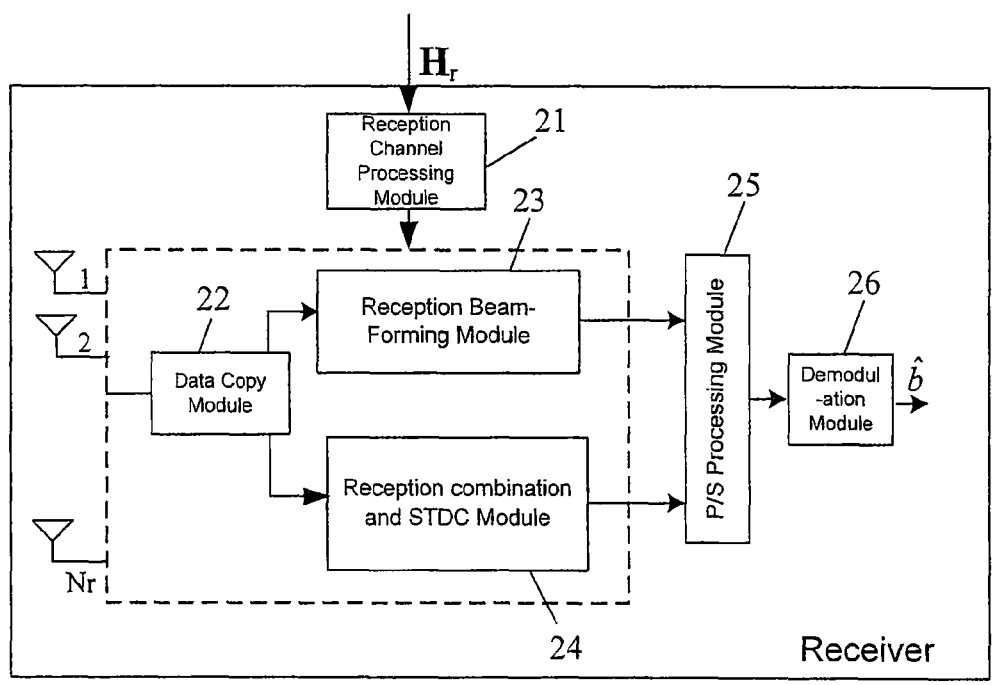
FIG. 2 is a block diagram of a receiver according to the present invention.

A communication system according to the present invention comprises a transmitter as shown in FIG. 1 and a receiver as shown in FIG. 2. Hereinafter, the process on the data transmitted by the transmitter according to the present invention will be described with reference to FIG. 1. The transmitter comprises a transmission channel processing module 11, a constellation-mapping module 12, a s/p (serial/parallel) processing module 13, a MIMO transmission preprocessing and coding module 14, a STC concatenation transmission pre-coding signal processing module 15 and a sum module 16.

The transmission channel processing module 11 is used to obtain gain statuses of respective sub-channels and parameters required for the MIMO transmission preprocessing and coding process and the STC concatenation transmission pre-coding signal process.

Specifically, the transmission channel processing module 11 firstly obtains a MIMO channel state information estimation $H_t$, which is an estimation of a real MIMO channel, and may be obtained via a feedback channel. That is, it can be fed back to the transmitter by using a selected feedback technique such as a quantization technique for a channel state information vector, a codebook technique etc. after estimating the MIMO channel by the receiver. If it is a TDD (Time Division Duplex) mode, the transmitter can firstly estimate the MIMO channel, and then obtain a reverse channel state information estimation directly according to a property of channel reciprocity.

Next, the transmission channel processing module 11 performs the following processes with the obtained MIMO channel state information estimation $H_t$.

The transmission channel processing module 11 performs SVD (singular value decomposition) on the MIMO channel state information estimation $H_t$, i.e. $H_t = U_t S_t V_t^H$, wherein $U_t$ represents left-singular vector matrix with $N_r \times N_r$ dimension, a $V_t$ denotes right-singular vector matrix with $N_t \times N_t$ dimension, H represents complex conjugate and transpose (Hermitian) of matrix, and $S_t$ represents a diagonal matrix with size of $N_r \times N_t$, in which the number of non-zero elements on diagonal is L, which represents the number of the independent sub-channels, and also represents the rank of the channel matrix H, i.e L=rank(H). $N_t$ represents the number of transmission antennas, and $N_r$ represents the number of receiving antennas.

The diagonal elements of $S_t$ represent gains of independent sub-channels respectively. Therefore, when transmitting data, the gains of the sub-channels can be determined according to $S_t$, so that it can be determined which sub-channels employ the beam-forming transmission, and which sub-channels use the transmission signal processing method with STC concatenation pre-coding.

Additionally, the transmission channel processing module 11 can obtain the transmission powers p1 and p2 of the high-gain channel and the low-gain channel according to the power allocation algorithm based on $S_t$. The power allocation algorithm can be designed according to a constraint optimization problem, for example, a water-filling algorithm. The transmission channel processing module 11 uses the first m column-vectors of $V_t$ to multiply with an allocated transmission power vector p1 to constitute the transmission beam-forming matrix $W_t$ which is of $N_t \times m$ dimension; and uses the remaining L-m column-vectors of $V_t$ to multiply with a transmission power vector p2 to constitute the pre-coding matrix $C_t$ which is of $N_t \times (L-m)$ dimension, wherein m is the number of sub-channels performing beam-forming transmission and 0<m<L.

The transmission channel processing module 11 obtains parameters from the above calculation for data transmission process. The specific operations on data transmission are as follows.

The transmitted bits b are divided into m-dimension symbol vector $x_1$ and (L-m) dimension symbol vector $x_2$ after processing by the constellation-mapping module 12 and the s/p processing module 13. $x_1$ is a m-dimension transmission symbol vector processed with beam-forming; $x_2$ is a (L-m) dimension transmission symbol vector processed with STC concatenation pre-coding process. m is the number of sub-channels performing transmission beam-forming, and L>m>=1. The value of m can be determined by the transmission channel processing module 11, i.e. can be determined by the diagonal elements of matrix $S_t$ calculated by the channel processing module. STC coding needs (L-m) symbols to perform coding once, but needs L-m transmission cycles to transmit.

The m-dimension symbol vector $x_1$ and the (L-m) dimension symbol vector $x_2$ processed by the s/p processing module 13 are input into the MIMO transmission preprocessing and coding module 14 and the STC concatenation transmission pre-coding signal processing module 15 respectively. In the MIMO transmission preprocessing and coding module 14, $W_t$ is left-multiplied by the symbol vector $x_1$ to result in a transmission vector with $N_t \times 1$ dimension. In the STC concatenation transmission pre-coding signal processing module 15, STC coding and pre-coding matrix $C_t$ process are performed on the symbol vector $x_2$ to form a transmission vector with $N_r \times 1$ dimension. The transmission vectors obtained from the MIMO transmission preprocessing and coding module 14 and the STC concatenation transmission pre-coding signal processing module 15 are transmitted to the sum module 16, which sums up the both transmitted vectors to generate a transmission vector to be transmitted via the corresponding $N_t$ transmission antennas.

Hereinafter, the process of the receiver will be described with reference to FIG. 2.

As shown in FIG. 2, the receiver according to FIG. 2 comprises a reception channel processing module 21, a data copy module 22, a reception beam-forming module 23, a reception combination and STDC (Spatial-Temporal DeCoding) module 24, a p/s (parallel/serial) processing module 25, and a demodulation module 26.

The reception channel processing module 21 firstly obtains a MIMO channel matrix estimation $H_r$, which is can be obtained by using channel estimation algorithms such as MMSE (Minimum Mean Square Error) channel estimation. Next, the reception channel processing module 21 performs SVD on the MIMO channel matrix estimation $H_r$, i.e. $H_r = U_r S_r V_r^H$, where $U_r$ is a matrix of dimension $N_r \times N_r$, $V_r$ represents a matrix with $N_r \times N_r$ dimension, $S_r$ represents a diagonal matrix with $N_r \times N_r$ dimension in which the number of non-zero diagonal elements is L, $(A)^H$ denotes complex conjugate and transpose (Hermitian) of matrix A. The reception channel processing module 21 takes the first m columns of vectors of $U_r$ to constitute a reception beam-forming matrix $W_r$, and takes the remaining (L-m) columns of vectors for $U_r$ to constitute a reception linear processing matrix $C_r$.

When the receiver receives data via antennas 1, 2, . . . , $N_r$, the data copy module 22 duplicates vector data of the received signal, one for inputting to the reception beam-forming module 23 and the other for inputting to the reception combination and STDC module 24. In the reception beam-forming module 23, the signal vector data from the data copy module 22 are multiplied by the reception beam-forming matrix $W_r$ obtained by the reception channel processing module 21 in order to decode the symbols sent over the highest-gain sub-channel. In the reception combination and STDC module 24, the signal vector data from the data copy module 22 are multiplied by the reception linear processing matrix $C_r$ obtained by the reception channel processing module 21, and then the STD (the maximal likelihood decoding or non-correlation decoding) is performed on it. After processed by the reception beam-forming module 23 and the reception combination and STDC module 24 as described above, the detected transmission symbols are output to the p/s processing module 25. The p/s processing module 25 performs p/s conversion on the decoded symbols, and the serial symbols are demodulated by the demodulation module 26, in order to recover the transmission bit sequence $\hat{b}$.

Hereinafter, an embodiment will be described according to the present invention with reference to FIG. 3. In the embodiment, the numbers of transmission and reception antennas are respectively 3 respectively, i.e. form a 3×3 MIMO channel. The highest-gain sub-channel performs the beam-forming transmission process, and the remaining 2 low-gain sub-channels perform STBC (Space-Temporal Block Coding) concatenation pre-coding on the transmission signal. The structure of the transmitter is shown in FIG. 3, where p1, p2, p3 are transmission powers allocated for the three sub-channels under the constraint on the total transmission power.

Figure 3:
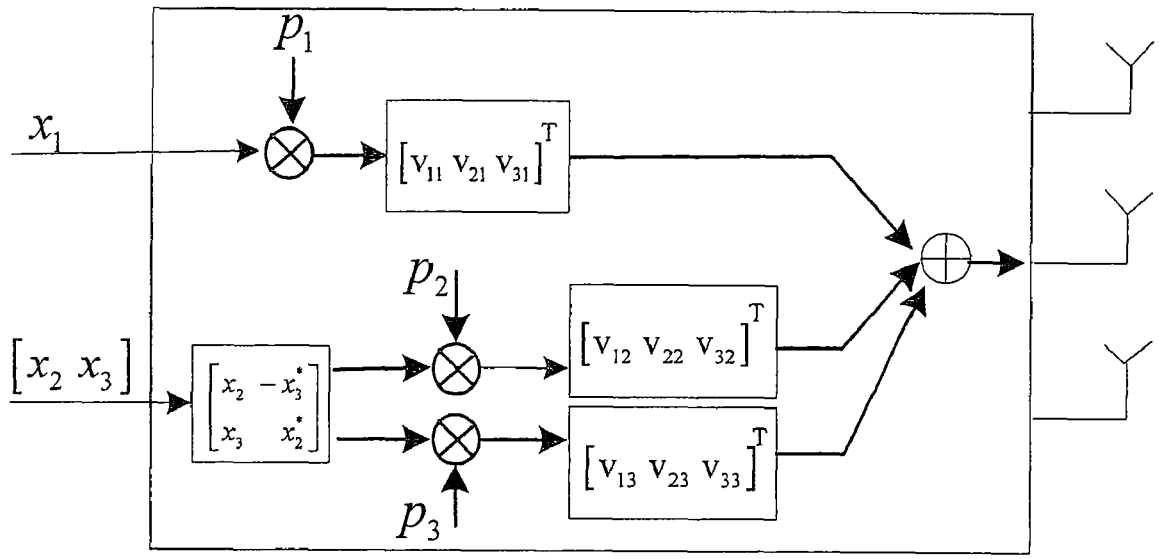
FIG. 3 is a signal processing flowchart of an embodiment of the transmitter according to the present invention.

As shown in FIG. 3, the symbol vectors x1, x2 and x3 are obtained after processing by the s/p processing module. Symbols included in vector x1 will be transmitted over sub-channel with the highest channel gain, and symbols included in vector x2 and x3 will be transmitted over remaining two sub-channels with lower channel gains. The vector x1 is multiplied by allocated transmission power p1 and the first column of $V_t$ (i.e. $[v_{11} v_{21} v_{31}]^T$) sequentially to obtain the transmission signal over the sub-channel with the highest gain. The symbol vectors x2 and x3 are firstly STBC coded $$\left(\text{i.e.} \begin{bmatrix} x_2 & -x_3^* \\ x_3 & x_2^* \end{bmatrix}\right),$$

and then multiplied by their transmission powers p2, p3 and the second column vector of $V_t$ (i.e. $[v_{12} v_{22} v_{32}]^T$) and the third column vector of $V_t$ (i.e. $[v_{13} v_{23} v_{33}]^T$), in order to obtain the transmitted signals on the low-gain channels. Only a processing on a signal is illustrated in FIG. 3. Obviously, it is possible to process as illustrated in FIG. 1. For example, the transmission power p1 may be multiplied by the first column of $V_t$ to obtain the transmission beam-forming matrix $W_t$, and the $W_t$ is left-multiplied by the symbol vector x1 to obtain the transmission vector.

In the embodiment of FIG. 3, the symbol rates over the two transmission links are the same, i.e., 1. Since STBC needs 2 symbols to perform coding and needs 2 transmission time periods to transmit 2 generated code symbols, the equivalent transmission symbol rate is equal as compared with the transmission beam-forming processing link, and the overall transmission symbol rate is 2.

Figure 4:
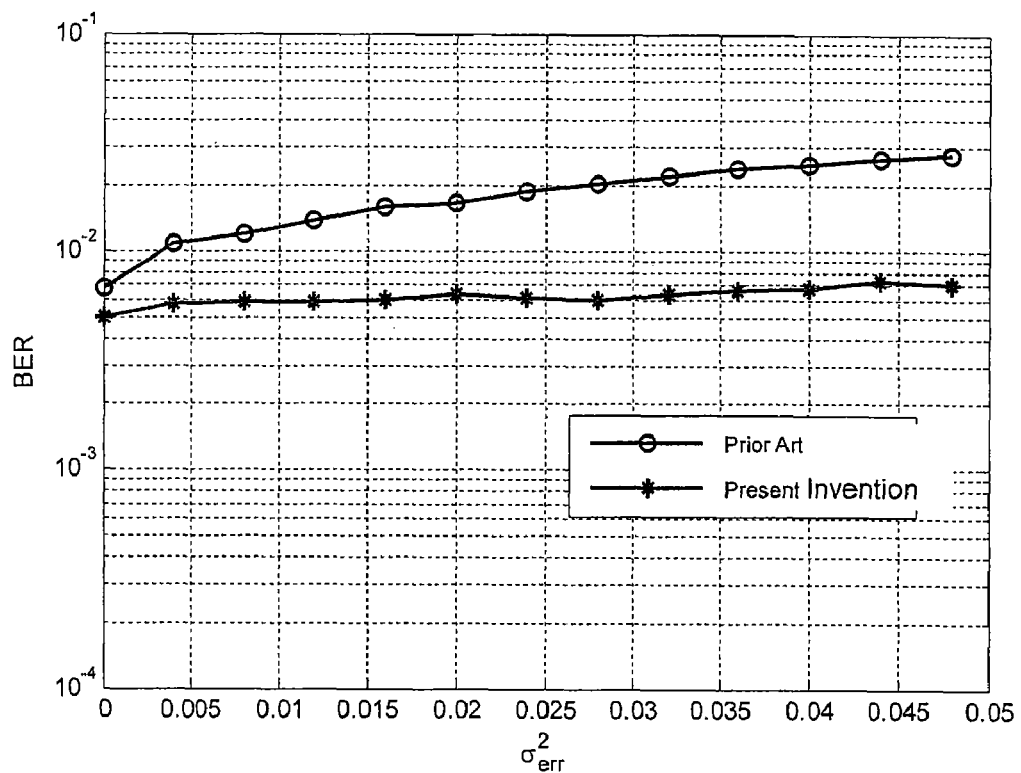
FIG. 4 is a performance simulation comparison view between the present invention and the prior art.

In FIG. 4, numerical simulation result shows the uncoded BER (Bit Error Rate) performance comparison between the present invention and the prior art. The horizontal axis $\sigma_{err}^2$ in FIG. 4 denotes the variance of estimation error for the channel state information from the transmitter (CSIT), and the vertical axis represents BER. As seen in FIG. 4, the present invention reduces sensitivity of the system performance to the channel state information error, as compared with the prior art with the complete use of the MIMO transmission pre-coding technique.

As compared with the technique with the complete use of the MIMO transmission pre-coding technique, the design of the transmission signal process according to the present invention reduces sensitivity of the system performance to the channel state information (CSI) error, i.e. obtains a robust system performance (referring to the result of performance simulation as shown in FIG. 4). The main reason is that the proposed design improves the performance gain on the low-gain sub-channel but at the cost of 1-symbol transmission symbol rate (taking FIG. 3 as an example). If the MIMO transmission pre-coding technique is used, the BER on the low-gain sub-channel is high although the symbol rate is 3, which degrades overall performance, especially in a low signal-noise-ratio regime or in the case of a high channel state information error obtained by the transmitter.

As compared with the signal processing method with the complete use of STC concatenation transmission pre-coding, the design of the transmission signal process according to the present invention improves the transmission symbol rate. By an example of a 3×3 MIMO channel, if the signal processing structure in the present invention is utilized, the obtained overall transmission symbol rate is 2 symbols; and if the STC concatenation transmission pre-coding signal processing method is used, the symbol rate is 1 symbol.

As compared with the signal processing method with the complete use of STC concatenation transmission pre-coding, the complexity of the signal processing in the transmitter and the receiver is reduced, since the beam-forming operation is linear, has a lower complexity than STC and decoding. While the proposed structure also uses STC structure, the number of dimension is reduced and thus the complexity is reduced, as compared with the signal processing method with the complete use of STC concatenation transmission pre-coding.

What is claimed is:

1. A transmitter, comprising
    a transmission channel processing module for obtaining gains of respective sub-channels;
    a first transmission preprocessing module for performing a first transmission preprocessing on transmission data transmitted over a spatial sub-channel with a high gain, based on a processed result from the transmission channel processing module;
    a second transmission preprocessing module for performing a second transmission preprocessing on transmission data transmitted over spatial a sub-channel with a low gain, based on a processed result from the transmission channel processing module;
    a summing module for summing up the transmission data processed by the first transmission preprocessing module and the second transmission preprocessing module respectively; and
    a transmitting antenna for the summed transmission data, wherein
    the first transmission preprocessing module is a MIMO (Multiple Input and Multiple Output) transmission preprocessing and coding module, which performs a MIMO transmission preprocessing and coding on the transmission data transmitted over the spatial sub-channel with the high gain;
    the second transmission preprocessing module is a signal processing module of STC (Spatial-Temporal Coding) combined with pre-coding, in which the transmission data transmitted over the spatial sub-channel with the low gain are processed by STC, and then processed by pre-coding,
    wherein the transmission channel processing module obtains a MIMO channel state information estimation $H_t$, and obtains gains of respective spatial sub-channels via SVD (Singular Value Decomposition) of the MIMO channel state information estimation $H_t$, wherein
    the transmission channel processing module obtains parameters for the MIMO transmission preprocessing and coding module and the STC combined with pre-coding signal processing module, by exploiting the MIMO channel state information estimation $H_t$ and, wherein
    the transmission channel processing module performs SVD (singular value decomposition) on the MIMO channel state information estimation $H_t$, wherein $H_t = U_t S_t V_t^H$, $U_t$ represents left-singular vector matrix with $N_r \times N_t$ dimension, $V_t$ denotes right-singular vector matrix with $N_t \times N_t$ dimension, $S_t$ represents a diagonal matrix with size of $N_t \times N_r$, H represents complex conjugate and transpose (Hermitian) of matrix, $N_t$ represents the number of transmit antennas, and $N_r$ represents the number of receive antennas.

2. The transmitter according to claim 1, wherein
    the transmission channel processing module obtains the gains of all the independent spatial sub-channels from the diagonal elements on $S_t$.

3. The transmitter according to claim 1, wherein
    the transmission channel processing module allocates transmission powers for all the active spatial sub-channels.

4. The transmitter according to claim 3, wherein
    the transmission channel processing module obtains a transmission beam-forming matrix $W_t$ and a pre-coding matrix $C_t$ via $V_t$ and the power allocation, the two matrixs, $W_t$ and $C_t$ are respectively utilized in the MIMO transmission preprocessing and coding module and the STC combined with transmission pre-coding signal processing module.

5. The transmitter according to claim 4, wherein
    the MIMO transmission preprocessing and coding module left-multiply the transmission data by $W_t$, so as to perform the MIMO transmission pre-coding processing;
    the STC combined with transmission pre-coding signal processing module performs STC on the transmission data and left-multiply them by the pre-coding matrix $C_t$, so as to perform the STC concatenation transmission pre-coding signal processing.

6. A transmitter, comprising
    a transmission channel processing module for obtaining gains of respective sub-channels;
    a first transmission preprocessing module for performing a first transmission preprocessing on transmission data transmitted over a spatial sub-channel with a high gain, based on a processed result from the transmission channel processing module;
    a second transmission preprocessing module for performing a second transmission preprocessing on transmission data transmitted over spatial a sub-channel with a low gain, based on a processed result from the transmission channel processing module;
    a summing module for summing up the transmission data processed by the first transmission preprocessing module and the second transmission preprocessing module respectively; and
    a transmitting antenna for the summed transmission data, wherein
    the transmitter further comprises a S/P (Serial/Parallel) processing module, which divides the transmission data into a first symbol vector with m-dimension and a second symbol vector with (L-m) dimension according to the processed result from the transmission channel processing module, and inputs them into the first transmission preprocessing module and the second transmission preprocessing module respectively, wherein m represents the number of independent spatial sub-channels for the first transmission preprocessing, L represents the total number of independent spatial sub-channels, and $L > m \geq 1$.

7. A communication system comprising a transmitter and a receiver, wherein
    the transmitter comprises,
        a transmission channel processing module for obtaining gains of respective spatial sub-channels;
        a first transmission preprocessing module for performing a first transmission preprocessing on transmission data transmitted over a spatial sub-channel with a high gain, based on a processed result from the transmission channel processing module;
        a second transmission preprocessing module for performing a second transmission preprocessing on transmission data transmitted over a spatial sub-channel with a low gain, based on a processed result from the transmission channel processing module;
        a summing module for summing up the transmission data processed by the first transmission preprocessing module and the second transmission preprocessing module respectively; and a transmitting antenna for the summed transmission data; and the receiver comprises, a reception antenna for receiving data from the transmitter;

a data copy module for receiving data from the antenna and copying the received data;

a first reception processing module for receiving any one of the data received and copied by the data copy module, and performing a first reception processing on the data in order to obtain the data processed by the first transmission preprocessing module; and a second reception processing module for receiving the other of the data received and copied by the data copy module, and performing a second reception processing on the data in order to obtain the data processed by the second transmission preprocessing module, wherein the first transmission preprocessing module is a MIMO transmission preprocessing and coding module, which performs a MIMO transmission preprocessing and coding on the transmission data transmitted over the high-gain spatial sub-channel;

the second transmission preprocessing module is a STC concatenation transmission pre-coding signal processing module, which performs a STC concatenation transmission pre-coding signal processing on the transmission data transmitted over the low-gain spatial sub-channel;

the first reception processing module is a reception beam-forming module for performing a reception beam-forming processing on the data; and the second reception processing module is a reception combination and STDC (Spatial-Temporal Decoding) module for performing a reception signal space-dimension combination and STDC processing on the data.

8. The communication system according to claim 7, further comprises, a reception channel processing module, which obtains a MIMO channel matrix estimation $H_r$, and obtains the parameters required for the first reception processing module and the second reception processing module based on the MIMO channel matrix estimation $H_r$.

9. The communication system according to claim 8, wherein the reception channel processing module performs SVD on the MIMO channel matrix estimation $H_r$, wherein $H_r = U_r S_r V_r^H$, $U_r$ represents a $N_r \times N_r$ dimension matrix, $V_r$ represents a $N_t \times N_t$ dimension matrix, H represents complex conjugate and transpose (Hermitian) of a matrix, $S_r$ represents a $N_r \times N_t$ dimension diagonal matrix, $N_t$ represents the number of transmission antennas, and $N_r$ represents the number of reception antennas; the reception channel processing module takes the first m columns of vectors for $U_r$ as a reception beam-forming matrix $W_r$, and takes the remaining (L-m) columns of vectors for $U_r$ as a reception linear processing matrix $C_r$, wherein m represents the number of spatial sub-channels for the first transmission preprocessing, L represents the total number of available spatial sub-channels, and $L > m \geq 1$.

10. The communication system according to claim 9, wherein the reception beam-forming module multiplies the data by the reception beam-forming matrix $W_r$ obtained from the reception channel processing module, the reception combination and STDC module multiplies the data by the reception linear processing matrix $C_r$ obtained from the reception channel processing module, and then performs STDC on them.

11. A communication system comprising a transmitter and a receiver, wherein the transmitter comprises, a transmission channel processing module for obtaining gains of respective spatial sub-channels;

a first transmission preprocessing module for performing a first transmission preprocessing on transmission data transmitted over a spatial sub-channel with a high gain, based on a processed result from the transmission channel processing module;

a second transmission preprocessing module for performing a second transmission preprocessing on transmission data transmitted over a spatial sub-channel with a low gain, based on a processed result from the transmission channel processing module;

a summing module for summing up the transmission data processed by the first transmission preprocessing module and the second transmission preprocessing module respectively; and a transmitting antenna for the summed transmission data; and the receiver comprises, a reception antenna for receiving data from the transmitter;

a data copy module for receiving data from the antenna and copying the received data;

a first reception processing module for receiving any one of the data received and copied by the data copy module, and performing a first reception processing on the data in order to obtain the data processed by the first transmission preprocessing module; and a second reception processing module for receiving the other of the data received and copied by the data copy module, and performing a second reception processing on the data in order to obtain the data processed by the second transmission preprocessing module, wherein the receiver further comprises P/S (parallel/serial) processing module for converting the processed result from the first reception processing module and the second reception processing module.

12. A communication method in a communication system comprising a transmitter and a receiver, the method comprises the following steps, performed by the transmitter, Step a for determining gains of respective spatial sub-channels;

Step b for performing a first transmission preprocessing on transmission data over a high-gain spatial sub-channel based on a result of Step a;

Step c for performing a second transmission preprocessing on transmission data over a low-gain spatial sub-channel based on a result of Step a; and Step d for summing up then transmission data processed by Step b and Step c and transmitting them, wherein the first transmission preprocessing performed in Step b is a MIMO transmission pre-coding processing;

the second transmission preprocessing performed in Step c is a STC concatenation transmission pre-coding signal processing.

13. The communication method according to claim 12, wherein in Step a, a MIMO channel state information estimation $H_r$ is firstly obtained, and then the gains of respective spatial sub-channels are obtained based on the MIMO channel state information estimation $H_r$.

14. The communication method according to claim 13, wherein
in Step a, it further comprises Step e for obtaining parameters required for the first transmission preprocessing performed in Step b and the second transmission preprocessing performed in Step c, based on the MIMO channel state information estimation $H_r$.

15. The communication method according to claim 14, wherein
in Step a, SVD on the MIMO channel state information estimation $H_t$ is performed, wherein $H_t=U_t S_t V_t^H$, $U_t$ represents a $N_t \times N_t$ dimension matrix, $V_t$ represents a $N_r \times N_r$ dimension matrix, $S_t$ represents a $N_t \times N_r$ dimension diagonal matrix, $N_t$ represents the number of transmission antennas, $N_r$ represents the number of reception antennas, and H represents a conjugate transposition; and the gains of the respective spatial sub-channels are determined according to obtained diagonal elements on a $S_t$.

16. The communication method according to claim 15, wherein
in Step a, a transmission power for the high-gain spatial sub-channel and a transmission power for the low-gain spatial sub-channel are obtained according to a power allocation algorithm based on $S_t$; and according to $V_t$ and the transmission power for the high-gain spatial sub-channel and the transmission power for the low-gain spatial sub-channel obtained based on $S_t$, a transmission beam-forming matrix $W_t$ and a pre-coding matrix $C_t$ are calculated, which are respectively the parameters required for the processing in Step b and Step c.

17. The communication method according to claim 16, wherein
in Step b, the transmitted data are left-multiplied by $W_t$, so as to perform the MIMO transmission pre-coding processing;
in Step c, the transmission data are STC-coded and then are left-multiplied by the pre-coding matrix $C_t$, so as to perform the STC concatenation transmission pre-coding signal processing.

18. A communication method in a communication system comprising a transmitter and a receiver, the method comprises the following steps, performed by the transmitter,
Step a for determining gains of respective spatial sub-channels;
Step b for performing a first transmission preprocessing on transmission data over a high-gain spatial sub-channel based on a result of Step a;
Step c for performing a second transmission preprocessing on transmission data over a low-gain spatial sub-channel based on a result of Step a; and
Step d for summing up then transmission data processed by Step b and Step c and transmitting them, wherein
the communication method further comprises Step f, in which the transmission data are divided into a first symbol vector of m-dimension and a second symbol vector of (L-m) dimension according to the processed result in Step a, wherein m represents the number of spatial sub-channels for the first transmission preprocessing, L represents the total number of spatial sub-channels, and L>m>=1, and
wherein in the step b, the first transmission preprocessing is performed on the first symbol vector; and in the step c, the second transmission preprocessing is performed on the second symbol vector.

19. The communication method according to claim 18, further comprises
Step g for receiving data transmitted in Step d, and copying the received data;
Step h for performing a first reception processing on any one of the received transmission data and copied data, in order to obtain the data processed by the first transmission preprocessing; and
Step i for performing a second reception processing on the other of the received transmission data and copied data, in order to obtain the data processed by the second transmission preprocessing.

20. The communication method according to claim 19, wherein
the first reception processing in Step h is a reception beam-forming processing; and
the second reception processing in Step i is a reception combination and STDC processing.

21. The communication method according to claim 19, further comprises
Step j for obtaining a MIMO channel matrix estimation $H_r$, and obtaining parameters required for Step h and Step i, based on the MIMO channel matrix estimation $H_r$.

22. The communication method according to claim 21, wherein
in Step j, SVD on the MIMO channel matrix estimation $H_r$ is performed, wherein $H_r=U_r S_r V_r^H$, $U_r$ represents a $N_r \times N_t$ dimension matrix, $V_r$ represents a $N_r \times N_r$ dimension matrix, $S_r$ represents a $N_r \times N_r$ dimension diagonal matrix, and H represents complex conjugate and transpose (Hermitian) of a matrix; the first m columns of vectors for $U_r$ are taken as a reception beam-forming matrix $W_r$, and the remaining (L-m) columns of vectors for $U_r$ are taken as a reception linear processing matrix $C_r$.

23. The communication method according to claim 22, wherein
in Step h, the data are multiplied by the reception beam-forming matrix $W_r$ obtained in Step j;
in Step i, the data are multiplied by the reception linear processing matrix $C_r$ obtained in Step j, and then STDC processing is performed on them.

* * * * *